(12) United States Patent
Wang et al.

(10) Patent No.: US 11,302,337 B2
(45) Date of Patent: Apr. 12, 2022

(54) VOICEPRINT RECOGNITION METHOD AND APPARATUS

(71) Applicant: BAIDU ONLINE NETWORK TECHNOLOGY (BEIJING) CO., LTD., Beijing (CN)

(72) Inventors: Wenyu Wang, Beijing (CN); Yuan Hu, Beijing (CN)

(73) Assignees: BAIDU ONLINE NETWORK TECHNOLOGY (BEIJING.) CO., LTD., Beijing (CN); SHANGHAI XIAODU TECHNOLOGY CO. LTD., Shanghai (CN)

( * ) Notice: Subject to any disclaimer, the term of this patent is extended or adjusted under 35 U.S.C. 154(b) by 622 days.

(21) Appl. No.: 16/300,444

(22) PCT Filed: Feb. 27, 2018

(86) PCT No.: PCT/CN2018/077359
§ 371 (c)(1),
(2) Date: Nov. 9, 2018

(87) PCT Pub. No.: WO2019/000991
PCT Pub. Date: Jan. 3, 2019

(65) Prior Publication Data
US 2021/0225380 A1     Jul. 22, 2021

(30) Foreign Application Priority Data
Jun. 30, 2017   (CN) .......................... 201710525251.5

(51) Int. Cl.
*G10L 17/04* (2013.01)
*G10L 15/06* (2013.01)
(Continued)

(52) U.S. Cl.
CPC ............ *G10L 17/04* (2013.01); *G10L 15/063* (2013.01); *G10L 15/22* (2013.01); *G10L 17/02* (2013.01); *G10L 2015/227* (2013.01)

(58) Field of Classification Search
CPC ....... G10L 17/04; G10L 15/063; G10L 15/22; G10L 17/02; G10L 2015/227
See application file for complete search history.

(56) References Cited

U.S. PATENT DOCUMENTS 9,812,151 B1 * 11/2017 Amini .................... G06V 20/40
2004/0190688 A1    9/2004 Timmins et al.
(Continued)

FOREIGN PATENT DOCUMENTS

| CN | 101441869 A | 5/2009 |
|---|---|---|
| CN | 102142254 A | 8/2011 |

(Continued)

*Primary Examiner* — Michael Colucci
(74) *Attorney, Agent, or Firm* — Seed IP L aw Group LLP (57) ABSTRACT

The present disclosure provides a voiceprint recognition method and apparatus, comprising: according to an obtained command speech, recognizing, in a voiceprint recognition manner, a user class sending a command speech; according to the user class, using a corresponding speech recognition model to perform speech recognition for the command speech, to obtain a command described by the command speech; providing resources according to the user class and command. The present disclosure can avoid the problems that in a conventional voiceprint recognition method in the prior art, a client needs to participate in voiceprint recognition, and the user's ID needs to be further recognized through a voiceprint training process, and that the user's degree of satisfaction is not high. While the user speaks naturally, it is feasible to perform processing for these very "ordinary" speech, and meanwhile complete the work of voiceprint recognition.

6 Claims, 3 Drawing Sheets

(51) Int. Cl.
*G10L 15/22* (2006.01)
*G10L 17/02* (2013.01)

(56) References Cited

U.S. PATENT DOCUMENTS

| | | | | |
|---|---|---|---|---|
| 2007/0100814 A1* | 5/2007 | Lee | ............ | G10L 15/18 |
| | | | | 707/999.005 |
| 2007/0124134 A1* | 5/2007 | Van Kommer | ....... | G10L 15/197 |
| | | | | 704/10 |
| 2011/0060587 A1* | 3/2011 | Phillips | ............ | G10L 15/30 |
| | | | | 704/235 |
| 2012/0042020 A1* | 2/2012 | Kolari | ............ | G06Q 10/107 |
| | | | | 709/206 |
| 2013/0173264 A1* | 7/2013 | Kiss | ............ | G10L 17/26 |
| | | | | 704/E15.001 |
| 2016/0260428 A1* | 9/2016 | Matsuda | ............ | G10L 15/16 |
| 2017/0193545 A1* | 7/2017 | Zhou | ............ | G06Q 30/0254 |

FOREIGN PATENT DOCUMENTS

| | | | |
|---|---|---|---|
| CN | 105045889 A | 11/2015 | |
| CN | 105068661 A | 11/2015 | |
| CN | 105426436 A | 3/2016 | |
| CN | 106548773 A | 3/2017 | |
| CN | 106557410 A | 4/2017 | |
| JP | 2003-115951 A | 4/2003 | |
| JP | 2009-271785 A | 11/2009 | |
| JP | 2013-164642 A | 8/2013 | |
| JP | 2014-164067 A | 9/2014 | |
| JP | 2016-71050 A | 5/2016 | |
| WO | 2015/029379 | 3/2015 | |

\* cited by examiner

VOICEPRINT RECOGNITION METHOD AND APPARATUS

The present disclosure claims priority to the Chinese patent application No. 201710525251.5 entitled "Voiceprint Recognition Method and Apparatus" filed on the filing date Jun. 30, 2017, the entire disclosure of which is hereby incorporated by reference in its entirety.

FIELD OF THE DISCLOSURE

The present disclosure relates to the field of artificial intelligence application, and particularly to a voiceprint recognition method and apparatus.

BACKGROUND OF THE DISCLOSURE

Artificial intelligence AI is a new technical science for researching and developing theories, methods, technologies and application systems for simulating, extending and expanding human intelligence. Artificial intelligence is a branch of computer sciences and attempts to learn about the essence of intelligence, and produces a type of new intelligent machines capable of responding in a manner similar to human intelligence. The studies in the field comprise robots, language recognition, image recognition, natural language processing, expert systems and the like. A very important aspect of artificial intelligence is voiceprint recognition technology.

In recent years, artificial intelligence technologies develop in a far-reaching manner and are gradually put into production as products. This is particular with smart speech dialogue products. As Amazon Echo smart sound system and Google Home smart sound system arise, this arouses a fashion trend for smart household products, particularly smart sound system products, who take dialogue as a main interaction manner.

A typical use scenario of smart speech dialogue products including smart loudspeaker box is at home. At home, the user interacts with the machine with speech very naturally. At home, usually there are multiple users, and each user certainly has a different demand. However, service of current products are very coarse, a set of identical service is provided to all users, and products answer the users' requests by the same set of standard standards, so that users' personalized demands cannot be satisfied.

Speech dialogue is advantageous in capability of receiving and recording the users' speech. Each person has his own speech. Each person's speech is called voiceprint like fingerprint. It is feasible to, through a speaker's voiceprint, judge which user the speaker is, and extract the user's data to provide personalized service. The present disclosure provides an optimal solution to the above problems on the basis of the voiceprint technology and in cooperation with a series of product policies.

Currently, the voiceprint technology in the industry is not mature and cannot meet productization requirements. Main problems of the current method are as follows:

(1) The current method depends on technologies so much. It is usual to wait the technologies to achieve an extremely high accuracy to put into production. However, progress of technologies is very long and slow process.

(2) Single policy: where the voiceprint technology is already used, the voiceprint use policy is too single, and technical drawbacks are not remedied through policies.

(3) A low productization degree. Due to impact of single policy and insufficient technical capability, production design is limited. Voiceprint is only used for very fundamental function. Even though voiceprint is utilized in products, it can only be applied to a very narrow scenario, for example, only applied to a specific sound wakeup device, and cannot not be used to provide personalized service. The voiceprint technology is not yet put into production to produce products.

In a conventional voiceprint recognition method, a client needs to participate in voiceprint recognition, and the user's ID needs to be further recognized through a voiceprint training process.

SUMMARY OF THE DISCLOSURE

A plurality of aspects of the present disclosure provide a voiceprint recognition method and apparatus, to provide the user with personalized service.

According to an aspect of the present disclosure, there is provided a voiceprint recognition method, comprising:

according to an obtained command speech, recognizing, in a voiceprint recognition manner, a user class sending a command speech;

according to the user class, using a corresponding speech recognition model to perform speech recognition for the command speech, to obtain a command described by the command speech;

providing resources according to the user class and command.

The user class comprises the user's sex and user's age group.

The above aspect and any possible implementation mode further provide an implementation mode: before the step of, according to an obtained command speech, recognizing, in a voiceprint recognition manner, a user class sending a command speech, the method further comprises:

performing model training according to speech features of different user classes, and building voiceprint processing models of different user classes.

The above aspect and any possible implementation mode further provide an implementation mode:

before the step of, according to the user class, using a corresponding speech recognition model to perform speech recognition for the command speech, to obtain a command described by the command speech, the method further comprises:

collecting language materials having colloquial features of different user classes to form a corpus, using the corpus to train the speech recognition model, and obtaining the speech recognition model of the corresponding user class.

The above aspect and any possible implementation mode further provide an implementation mode:

looking up for a recommended interest class matched with the command, according to the user class;

searching for a target resource matched with the recommended interest class, and presenting the target resource to the user.

The above aspect and any possible implementation mode further provide an implementation mode:

the looking up for a recommended interest class matched with the command, according to the user class comprises:

determining a current vertical class according to the command;

according to the current vertical class and the user's attribution information, using a pre-built user interest model to obtain recommended content.

The above aspect and any possible implementation mode further provide an implementation mode:

the attribute information comprises at least one of user's age group and user's sex.

The above aspect and any possible implementation mode further provide an implementation mode:

before looking up for a recommended interest class matched with the command, according to the user class, the method further comprises:

obtaining a user historical log, wherein the user historical log at least comprises: a user identifier, user attribute information, and user historical behavior data;

performing classification statistics for the user historical behavior data according to the user class and vertical class, to obtain the user interest model.

According to another aspect of the present disclosure, there is provided a voiceprint recognition apparatus, comprising:

a voiceprint recognition module configured to, according to an obtained command speech, recognize, in a voiceprint recognition manner, a user class sending a command speech;

a speech recognition module configured to, according to the user class, use a corresponding speech recognition model to perform speech recognition for the command speech, to obtain a command described by the command speech;

a provision module configured to provide resources according to the user class and command.

The above aspect and any possible implementation mode further provide an implementation mode: the user class comprises the user's sex and age group.

The above aspect and any possible implementation mode further provide an implementation mode: the voiceprint recognition module further comprises:

a voiceprint processing module building submodule configured to perform model training according to speech features of different user classes, and build voiceprint processing models of different user classes.

The above aspect and any possible implementation mode further provide an implementation mode: the speech recognition module further comprises:

a speech recognition model building submodule configured to collect language materials having colloquial features of different user classes to form a corpus, use the corpus to train the speech recognition model, and obtain the speech recognition model of the corresponding user class.

The above aspect and any possible implementation mode further provide an implementation mode: the provision module comprises:

a lookup submodule configured to look up for a recommended interest class matched with the command, according to the user class;

a presentation submodule configured to search for a target resource matched with the interest class, and present the target resource to the user.

The above aspect and any possible implementation mode further provide an implementation mode: the lookup submodule further comprises:

a vertical class determining submodule configured to determine a current vertical class according to the command;

a content obtaining submodule configured to, according to the current vertical class and the user's attribution information, use a pre-built user interest model to obtain a recommended interest class matched with the command.

The above aspect and any possible implementation mode further provide an implementation mode: the attribute information comprises at least one of user's age group and user's sex.

The above aspect and any possible implementation mode further provide an implementation mode: the lookup submodule further comprises a user interest model building submodule configured to:

obtain a user historical log, wherein the user historical log at least comprises: a user identifier, user attribute information, and user historical behavior data;

perform classification statistics for the user historical behavior data according to the user class and vertical class, to obtain the user interest model.

According to a further aspect of the present disclosure, there is provided a device, wherein the device comprises:

one or more processor;

a storage for storing one or more programs, said one or more programs, when executed by said one or more processors, enable said one or more processors to implement the above-mentioned method.

According to a further aspect of the present disclosure, there is provided a computer readable storage medium on which a computer program is stored, wherein the program, when executed by a processor, implements the above-mentioned method.

As can be from the above introduction, according to the solutions of the present disclosure, the recommendation policy becomes sounder, the recommendation is more accurate, and therefore the user's satisfaction is improved; even though accidentally there occur a recognition error and recommendation error, the user does not sense them obviously; requirements of productization for technologies are reduced.

DETAILED DESCRIPTION OF PREFERRED EMBODIMENTS

The present disclosure will be described in detail with reference to figures and specific embodiments to make objectives, technical solutions and advantages of the present disclosure more apparent.

Figure 1:
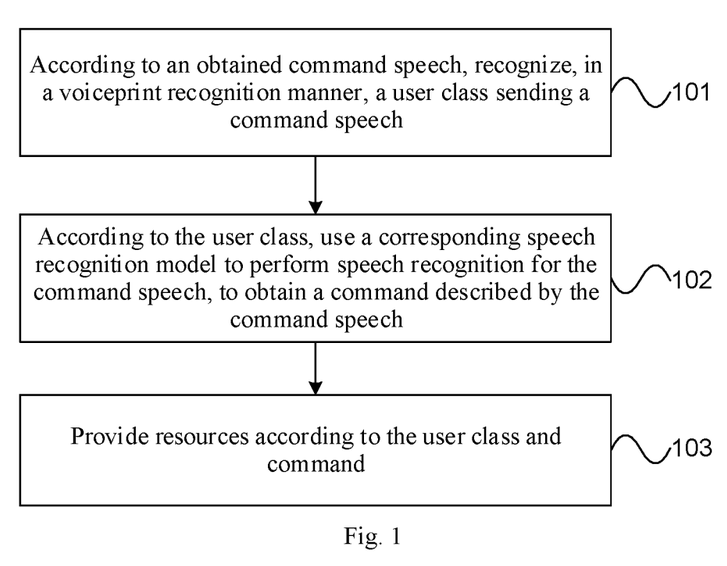
FIG. 1 is a flow chart of a voiceprint recognition method according to an embodiment of the present disclosure.

FIG. 1 is a flow chart of a voiceprint recognition method according to an embodiment of the present disclosure. As shown in FIG. 1, the method comprises the following steps:

At 101, according to an obtained command speech, recognize, in a voiceprint recognition manner, a user class sending a command speech.

Specifically, the user class comprises the user's sex and age group.

Since different user classes, namely, user groups with different sex and age groups have special voiceprint features, it is possible to, before performing voiceprint recognition, perform model training according to speech features of different user classes, build voiceprint processing models of different user classes, to implement voiceprint analysis for user groups of different user classes. When the user initiates speech search, it is feasible to recognize, in a voiceprint recognition manner, information such as sex and age group of the user sending the command speech according to the user-sent command speech.

Before voiceprint recognition, it is necessary to build a model for the speaker's voiceprint, namely, "train" or "learn". Specifically, it is feasible to use a deep neural network DNN voiceprint baseline system to extract a first feature vector of each speech in a training set; train a sex classifier and an age classifier according to the first feature vector of each speech and pre-annotated sex and age group tags respectively, thereby building a voiceprint processing model distinguishing sex and age group.

It is feasible to, according to the obtained command speech, extract first feature information of the command speech, and send the first feature information to pre-generated sex classifier and age group classifier respectively. The sex classifier and age group classifier analyze the first feature information, and obtain a sex tag and an age group tag of the first feature information, namely, the sex tag and age group tag of the command speech.

For example, an example is taken in which the sex classifier is a Gaussian mixture model. It is feasible to first extract a fundamental frequency feature and Mel Frequency Cepstral Coefficent MFCC feature for the speech request, then perform posterior probability value calculation for the fundamental frequency feature and MFCC feature based on the Gaussian mixture model, and determine the sex of the user according to a calculation result. For example, assuming that the Gaussian mixture model is a male Gaussian mixture model, when the calculation result is that the posterior probability value is very high, e.g., larger than a certain threshold, it may be determined that the user's sex is male; when the calculation result is that the posterior probability value is very small, e.g., smaller than a certain threshold, it may be determined that the user's sex is female.

Preferably, after the age group and sex information of the user sending the command speech is recognized, a voiceprint ID of the user sending the command speech is further recognized.

Each user's speech has a sole voiceprint ID which records the user's personal data such as name, sex, age and hobby.

Preferably, it is feasible to extract the voiceprint feature of the user's command speech to match one by one with registered voiceprint models pre-stored in cloud, and if a match value is larger than a threshold, determine the user's user voiceprint ID, or if the match value is smaller than the threshold, determine that the user does not register.

Preferably, the voiceprint feature is a d-vector feature, is a feature extracted through a deep neural network (DNN), and is specifically output of the last hidden layer in the DNN.

In 102, according to the user class, use a speech recognition model corresponding to the user class to perform speech recognition for the command speech, to obtain a command described by the command speech.

After the speech recognition technology is employed, the speech information of the command speech may be recognized as text information, and then corresponding control may be performed according to the text information.

To improve recognition accuracy, it is necessary to pre-build a speech recognition model for different user classes.

Specifically, it is feasible to collect language materials having colloquial features of different user classes to form a corpus, use the corpus to train the speech recognition model, and obtain the speech recognition model of the corresponding user class.

For example, in the case that the age group in the user class is child, it is feasible to collect language materials having children's colloquial features to form the corpus, and then use the corpus to train the model to obtain a children speech recognition model.

The children colloquial feature here may specifically include word repetition, unclear enunciation and erroneous pause of sentences.

Furthermore, in the case that the user class is a child user, a child model is automatically activated. It is possible to employ a speech interaction manner with a dialogue mode which the child is accustomed to, to perform content screening and optimization for the child.

The interaction of the child mode should be designed specially and conforms to the child's dialogue habits. For example, the broadcasting voice of TTS may be a child's voice or a young female's voice, which can make the child feel closer. The broadcasting voice may use many reduplicative words to make children hear more comfortably. Regarding chat data often expressed by children, children's chat is designed to accompany and attend to the children in their growth.

The child mode requires all content resources to be screened carefully to remove pornographic and violence content. All contents such as music, audio, movies and TV programs should precisely meet children's requirements. For example, music should mostly be children's songs, audio should mostly be children's stories, movies should mostly be animated movies, and TV programs should mostly be animated TV programs.

At 103, provide resources according to the user class and command.

Figure 2:
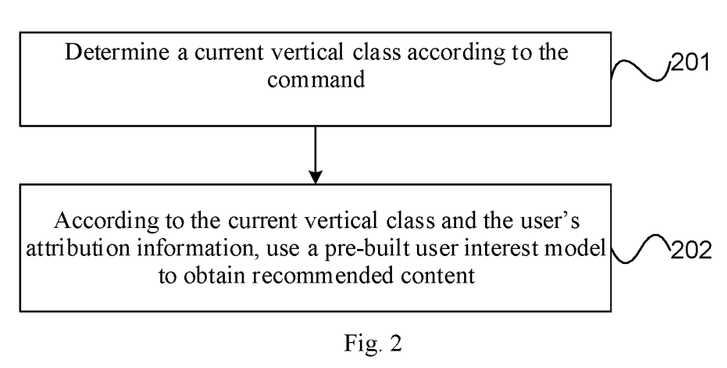
FIG. 2 is a flow chart of a step of looking up for a recommended interest class matched with a command according to a user class according to the voiceprint recognition method according to an embodiment of the present disclosure.

Specifically, the step comprises the following sub-steps:

looking up for a recommended interest class matched with the command, according to the user class;

searching for a target resource matched with the recommended interest class, and presenting the target resource to the user.

the sub-step of looking up for a recommended interest class matched with the command, according to the user class comprises the following sub-steps as shown in FIG. 2:

At 201, determine a current vertical class according to the command, the current vertical class comprising music, audio book, broadcast, radio station, video, movie, fine foods, and chat;

For example, when the user command is "play a song", determine that the current vertical class is music;

For example, when the user command is "play a movie", determine that the current vertical class is movie;

For example, when the user command is "are there any find foods", determine that the current vertical class is fine foods.

At 202, according to the current vertical class and the user's attribution information, use a pre-built user interest model to obtain the recommended interest class matched with the command.

Wherein the attribute information comprises at least one of age group, sex and interest information.

Preferably, pre-building the user interest model comprises:

obtaining a user historical log, wherein the user historical log at least comprises: a user identifier, user attribute information, and user historical behavior data;

performing classification statistics for the user historical behavior data according to the user class and vertical class, to obtain the user interest model.

It is feasible to obtain a lot of user historical logs in a preset time granularity (e.g., two months, four months, or half a year). Due to the user's behavior habit, it is feasible to obtain, from a lot of user historical logs, a specific behavior performed by a different user class under a specific vertical class, namely, the user interest inclination. In other words, it is possible to perform classification statistics for the user historical behavior data according to the user class and vertical class, to obtain the user interest model. The user interest model may be used to determine a recommendation policy. A vertical class recommendation policy under different scenarios such as music, audio book, broadcast, radio station, video, movie, fine foods, and chat comprises the user's age group and sex dimension. That is, it is feasible to, according to the current user class and vertical class, use the user interest model to determine a recommended interest class associated with the current user class and current vertical class.

For example, if video viewed by a user in a children age group in the video vertical class comprises animated video such as My Little Pony, Dora the Explorer and Peppa Pig, it may be obtained by mining historical behaviors of users in the age group that the recommended interest class of the children age group in the video vertical class is animated video.

Preferably, if the user's user voiceprint ID is determined, it is feasible to, according to the current vertical class, use the user interest model corresponding to the user voiceprint ID to determine recommended content associated with the current user and the current vertical class, wherein it is feasible to, according to the user voiceprint ID, obtain the user historical behavior data corresponding to the user voiceprint ID; and perform classification statistics for the user historical behavior data according to the vertical class, to obtain the user interest model.

At 104, search, from a multimedia resource library, for a target resource matched with the recommended interest class, and present the target resource to the user.

For example,

In the music vertical class, when the user speaks out a general demand such as "play a song", if the user is recognized as a female, it is recommended that soothing and romantic music be played; if the user is recognized as a male, it is recommended that rock and roll and enthusiastic music be played; if the user is recognized as an old man, it is recommended that music such as opera be played; if the user is recognized as a child, it is recommended that music in the classes such as children song be played. Age and sex may be considered in combination, so that it is feasible to recommend different types of children songs for little boys and little girls.

In the movie vertical class, when the user speaks out a general demand such as "play a movie", if the user is recognized as a male, a movie in a class such as the latest and hottest action movie is recommended; if the user is recognized as a female, a movie in a class such as love movie is recommended; if the user is recognized as a child, an animated movie is recommended.

In the fine foods vertical class, when the user speaks out "are there any fine foods to be recommended?", if the user is recognized as a child, fine foods in a class such as sweet foods are recommended; if the user is recognized as a female, sweet foods or canteens with a romantic dining environment are recommended.

In the technical solution of the present embodiment, the voiceprint recognition process is implicit recommendation recognition. There is not a recognition process for a specific voiceprint or who the user is. Instead, while the user speaks naturally, it is feasible to perform processing for these very "ordinary" command speech, and meanwhile complete the work of voiceprint recognition.

Since the voiceprint recognition is implicit recommendation recognition, even though accidentally there occur a recognition error and recommendation error, the user does not sense them obviously.

As the smart recognition enters the child mode, the interaction advantage of the speech dialogue product is utilized sufficiently. The smart entry into the child mode can be implemented without actively querying for the user's age, and the user's experience is better.

With the age and sex being added to the recommendation policy, the recommendation policy becomes sounder, the recommendation is more accurate, and therefore the user's satisfaction is improved.

Requirements of productization for technologies are reduced, productization of technologies may also be implemented when technologies do not reach an extremely high accuracy so that the user can experience improvement of satisfaction resulting from technologies. Meanwhile, since there will be more data after productization, regarding the voiceprint recognition technology based on the machine learning technology, more data accelerates the iteration process of the technology, so that products supplement the technology in return, the technology can be more deeply used for productization, and the process gets into a positive cycle.

It needs to be appreciated that regarding the aforesaid method embodiments, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 3:
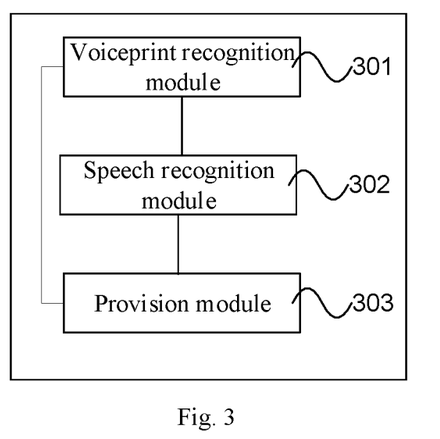
FIG. 3 is a structural schematic diagram of a voiceprint recognition apparatus according to an embodiment of the present disclosure.

FIG. 3 is a structural schematic diagram of a voiceprint recognition apparatus according to an embodiment of the present disclosure. As shown in FIG. 3, the voiceprint recognition apparatus comprises a voiceprint recognition module 301, a speech recognition module 302 and a provision module 303, wherein, the voiceprint recognition module 301 is configured to, according to an obtained command speech, recognize, in a voiceprint recognition manner, a user class sending a command speech.

Specifically, the user class comprises the user's sex and age group.

Since different user classes, namely, user groups with different sex and age groups have special voiceprint features, the voiceprint recognition module 301 further comprises a voiceprint processing module building submodule configured to perform model training according to speech features of different user classes, build voiceprint processing models of different user classes, to implement voiceprint analysis for user groups of different user classes. When the user initiates speech search, it is feasible to recognize, in a voiceprint recognition manner, information such as sex and age group of the user sending the command speech according to the user-sent command speech.

Before voiceprint recognition, it is necessary to build a model for the speaker's voiceprint, namely, "train" or "learn". Specifically, it is feasible to use a deep neural network DNN voiceprint baseline system to extract a first feature vector of each speech in a training set; train a sex classifier and an age classifier according to the first feature vector of said each speech and pre-annotated sex and age group tags respectively, thereby building a voiceprint processing model distinguishing sex and age group.

It is feasible to, according to the obtained command speech, extract first feature information of the command speech, and send the first feature information to pre-generated sex classifier and age group classifier respectively. The sex classifier and age group classifier analyze the first feature information, and obtain a sex tag and an age group tag of the first feature information, namely, the sex tag and age group tag of the command speech.

For example, an example is taken in which the sex classifier is a Gaussian mixture model. It is feasible to first extract a fundamental frequency feature and Mel Frequency Cepstral Coefficent MFCC feature for the speech request, then perform posterior probability value calculation for the fundamental frequency feature and MFCC feature based on the Gaussian mixture model, and determine the sex of the user according to a calculation result. For example, assuming that the Gaussian mixture model is a male Gaussian mixture model, when the calculation result is that the posterior probability value is very high, e.g., larger than a certain threshold, it may be determined that the user's sex is male; when the calculation result is that the posterior probability value is very small, e.g., smaller than a certain threshold, it may be determined that the user's sex is female.

Preferably, after the age group and sex information of the user sending the command speech is recognized, a voiceprint ID of the user sending the command speech is further recognized.

Each user's speech has a sole voiceprint ID which records the user's personal data such as name, sex, age and hobby.

Preferably, it is feasible to extract the voiceprint feature of the user's command speech to match one by one with registered voiceprint models pre-stored in cloud, and if a match value is larger than a threshold, determine the user's user voiceprint ID, or if the match value is smaller than the threshold, determine that the user does not register.

Preferably, the voiceprint feature is a d-vector feature, is a feature extracted through a deep neural network (DNN), and is specifically output of the last hidden layer in the DNN.

The speech recognition module 302 is configured to, according to the user class, use a speech recognition model corresponding to the user class to perform speech recognition for the command speech, to obtain a command described by the command speech.

To improve recognition accuracy, the speech recognition model 302 further comprises a speech recognition model building submodule configured to pre-build a speech recognition model for different user classes.

Specifically, it is feasible to collect language materials having colloquial features of different user classes to form a corpus, use the corpus to train the speech recognition model, and obtain the speech recognition model of the corresponding user class.

For example, in the case that the age group in the user class is child, it is feasible to collect language materials having children's colloquial features to form the corpus, and then use the corpus to train the model to obtain a children speech recognition model.

The children colloquial feature here may specifically include word repetition, unclear enunciation and erroneous pause of sentences.

Furthermore, there is further included a child guidance module configured to, in the case that the user class is a child user, automatically activate a child model. It is possible to employ a speech interaction manner with a dialogue mode which the child is accustomed to, to perform content screening and optimization for the child.

The interaction of the child mode should be designed specially and conforms to the child's dialogue habits. For example, the broadcasting voice of TTS may be a child's voice or a young female's voice, which can make the child feel closer. The broadcasting voice may use many reduplicative words to make children hear more comfortably. Regarding chat data often expressed by children, children's chat is designed to accompany and attend to the children in their growth.

The child mode requires all content resources to be screened carefully to remove pornographic and violence content. All contents such as music, audio, movies and TV programs should precisely meet children's requirements. For example, music should mostly be children's songs, audio should mostly be children's stories, movies should mostly be animated movies, and TV programs should mostly be animated TV programs.

The provision module 303 is configured to provide resources according to the user class and command; specifically, the provision module comprises:

a lookup submodule configured to look up for a recommended interest class matched with the command, according to the user class;

a presentation submodule configured to search for a target resource matched with the recommended interest class, and present the target resource to the user.

wherein the lookup submodule is configured to look up for a recommended interest class matched with the command, according to the user class.

Figure 4:
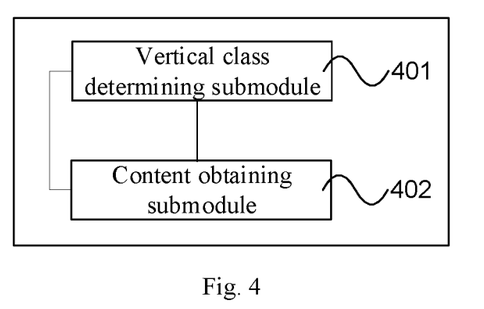
FIG. 4 is a structural schematic diagram of a lookup module of the voiceprint recognition apparatus according to an embodiment of the present disclosure.

Specifically, as shown in FIG. 4, the lookup submodule comprises the following submodules:

a vertical class determining submodule 401 configured to determine a current vertical class according to the command, the current vertical class comprising music, audio book, broadcast, radio station, video, movie, fine foods, and chat;

For example, when the user command is "play a song", determine that the current vertical class is music;

For example, when the user command is "play a movie", determine that the current vertical class is movie;

For example, when the user command is "are there any find foods", determine that the current vertical class is fine foods.

A content obtaining submodule 402 configured to, according to the current vertical class and the user's attribution information, use a pre-built user interest model to obtain the recommended interest class matched with the command.

Wherein the attribute information comprises at least one of age group, sex and interest information.

Preferably, the lookup submodule further comprises a user interest model building submodule 403 configured to pre-build the user interest module, comprising:

obtaining a user historical log, where the user historical log at least comprises: a user identifier, user attribute information, and user historical behavior data;

performing classification statistics for the user historical behavior data according to the user class and vertical class, to obtain the user interest model.

It is feasible to obtain a lot of user historical logs in a preset time granularity (e.g., two months, four months, or half a year).

Due to the user's behavior habit, it is feasible to obtain, from a lot of user historical logs, a specific behavior performed by a different user class under a specific vertical class, namely, the user interest inclination. In other words, it is possible to perform classification statistics for the user historical behavior data according to the user class and vertical class, to obtain the user interest model. The user interest model may be used to determine a recommendation policy. A vertical class recommendation policy under different scenarios such as music, audio book, broadcast, radio station, video, movie, fine foods, and chat comprises the user's age group and sex dimension. That is, it is feasible to, according to the current user class and vertical class, use the user interest model to determine a recommended interest class associated with the current user class and current vertical class.

For example, if video viewed by a user in a children age group in the video vertical class comprises animated video such as My Little Pony, Dora the Explorer and Peppa Pig, it may be obtained by mining historical behaviors of users in the age group that the recommended interest class of the children age group in the video vertical class is animated video.

Preferably, if the user's user voiceprint ID is determined, it is feasible to, according to the current vertical class, use the user interest model corresponding to the user voiceprint ID to determine recommended content associated with the current user and the current vertical class, wherein it is feasible to, according to the user voiceprint ID, obtain the user historical behavior data corresponding to the user voiceprint ID; and perform classification statistics for the user historical behavior data according to the vertical class, to obtain the user interest model.

The presentation submodule is configured to search, from a multimedia resource library, for a target resource matched with the recommended interest class, and present the target resource to the user.

For example,

In the music vertical class, when the user speaks out a general demand such as "play a song", if the user is recognized as a female, it is recommended that soothing and romantic music be played; if the user is recognized as a male, it is recommended that rock and roll and enthusiastic music be played; if the user is recognized as an old man, it is recommended that music such as opera be played; if the user is recognized as a child, it is recommended that music in the classes such as children song be played. Age and sex may be considered in combination, so that it is feasible to recommend different types of children songs for little boys and little girls.

In the movie vertical class, when the user speaks out a general demand such as "play a movie", if the user is recognized as a male, a movie in a class such as the latest and hottest action movie is recommended; if the user is recognized as a female, a movie in a class such as love movie is recommended; if the user is recognized as a child, an animated movie is recommended.

In the fine foods vertical class, when the user speaks out "are there any fine foods to be recommended?", if the user is recognized as a child, fine foods in a class such as sweet foods are recommended; if the user is recognized as a female, sweet foods or canteens with a romantic dining environment are recommended.

In the technical solution of the present embodiment, the voiceprint recognition process is implicit recommendation recognition. There is not a recognition process for a specific voiceprint or who the user is. Instead, while the user speaks naturally, it is feasible to perform processing for these very "ordinary" command speech, and meanwhile complete the work of voiceprint recognition.

Since the voiceprint recognition is implicit recommendation recognition, even though accidentally there occur a recognition error and recommendation error, the user does not sense them obviously.

As the smart recognition enters the child mode, the interaction advantage of the speech dialogue product is utilized sufficiently. The smart entry into the child mode can be implemented without actively querying for the user's age, and the user's experience is better.

With the age and sex being added to the recommendation policy, the recommendation policy becomes sounder, the recommendation is more accurate, and therefore the user's satisfaction is improved.

Requirements of productization for technologies are reduced, productization of technologies may also be implemented when technologies do not reach an extremely high accuracy so that the user can experience improvement of satisfaction resulting from technologies. Meanwhile, since there will be more data after productization, regarding the voiceprint recognition technology based on the machine learning technology, more data accelerates the iteration process of the technology, so that products supplement the technology in return, the technology can be more deeply used for productization, and the process gets into a positive cycle.

Those skilled in the art can clearly understand that for purpose of convenience and brevity of depictions, reference may be made to corresponding procedures in the aforesaid method embodiments for specific operation procedures of the terminal and server, which will not be detailed any more.

In the embodiments provided by the present disclosure, it should be understood that the revealed method and apparatus can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

Figure 5:
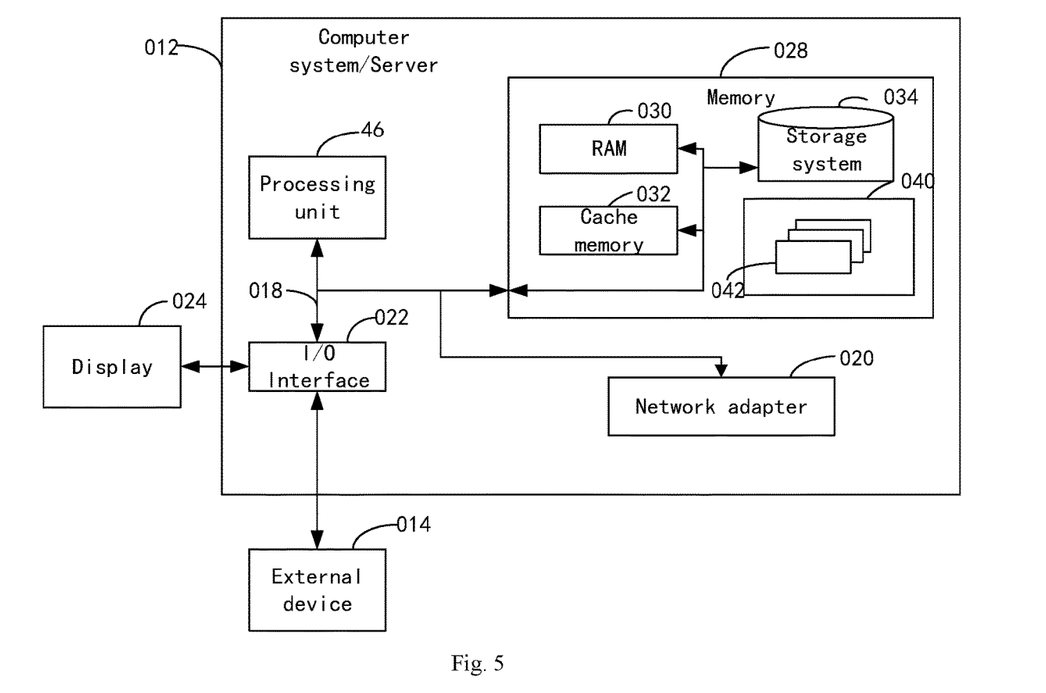
FIG. 5 is a block diagram of an example computer system/server adapted to implement an implementation mode of the present disclosure.

FIG. 5 illustrates a block diagram of an example computer system/server 012 adapted to implement an implementation mode of the present disclosure. The computer system/server 012 shown in FIG. 5 is only an example and should not bring about any limitation to the function and scope of use of the embodiments of the present disclosure.

As shown in FIG. 5, the computer system/server 012 is shown in the form of a general-purpose computing device. The components of computer system/server 012 may include, but are not limited to, one or more processors (processing units) 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 communicates with an external radar device, or with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via a network adapter 020. As depicted in the figure, network adapter 020 communicates with the other communication modules of computer system/server 012 via the bus 018. It should be understood that although not shown in FIG. 5, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes functions and/or methods in the embodiments described in the present disclosure by running programs stored in the system memory 028.

The above-mentioned computer program may be set in a computer storage medium, i.e., the computer storage medium is encoded with a computer program. When the program, executed by one or more computers, enables said one or more computers to execute steps of methods and/or operations of apparatuses as shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a computer readable signal medium or a computer readable storage medium. A computer readable medium for example may include, but not limited to, an electronic, magnetic, optical, electromagnetic, infrared, or semiconductor system, apparatus, or device, or any suitable combination of the foregoing. More specific examples (non-exhaustive listing) of the computer readable storage medium would include an electrical connection having one or more conductor wires, a portable computer magnetic disk, a hard disk, a random access memory (RAM), a read-only memory (ROM), an erasable programmable read-only memory (EPROM or Flash memory), optical fiber, a portable compact disc read-only memory (CD-ROM), an optical storage device, a magnetic storage device, or any suitable combination of the foregoing. In the text herein, the computer readable storage medium can be any tangible medium that includes or stores a program. The program may be used by an instruction execution system, apparatus or device or used in conjunction therewith.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A voiceprint recognition method, wherein the method comprises:
   pre-establishing a user interest model, comprising:
      obtaining a user history log, where the user history log includes at least: a user identifier, user attribute information, and user historical behavior data; and
      classifying the user historical behavior data according to a user category and a vertical class to obtain the user interest model;
   performing model training according to speech features of different user classes, and building voiceprint processing models of different user classes;
   according to an obtained command speech, recognizing, in a voiceprint recognition manner, a user class sending a command speech;
   collecting language materials having colloquial features of different user classes to form a corpus, using the corpus to train a speech recognition model, and obtaining a speech recognition model of the corresponding user class;
   according to the user class, using the speech recognition model to perform speech recognition for the command speech, to obtain a command described by the command speech;
   determining a current vertical class, according to the command;
   according to the user class and the current vertical class, using the pre-built user interest model to obtain a recommended interest class associated with the user class and current vertical class;
   searching, from a multimedia resource library, for a target resource matched with the recommended interest class, and presenting the target resource to the user.

2. The voiceprint recognition method according to claim 1, wherein, the user class comprises the user's sex and user's age group.

3. A device, wherein the device comprises:
   one or more processors;
   a storage for storing one or more programs,
   said one or more programs, when executed by said one or more processors, enable said one or more processors to implement a voiceprint recognition method, wherein the method comprises:
      pre-establishing a user interest model, comprising:
         obtaining a user history log, where the user history log includes at least: a user identifier, user attribute information, and user historical behavior data; and
         classifying the user historical behavior data according to a user category and a vertical class to obtain the user interest model;
      performing model training according to speech features of different user classes, and building voiceprint processing models of different user classes;
      according to an obtained command speech, recognizing, in a voiceprint recognition manner, a user class sending a command speech;
      collecting language materials having colloquial features of different user classes to form a corpus, using the corpus to train a speech recognition model, and obtaining a speech recognition model of the corresponding user class;
      according to the user class, using the speech recognition model to perform speech recognition for the command speech, to obtain a command described by the command speech;
      determining a current vertical class, according to the command;
      according to the user class and the current vertical class, using the pre-built user interest model to obtain a recommended interest class associated with the user class and current vertical class;
      searching, from a multimedia resource library, for a target resource matched with the recommended interest class, and presenting the target resource to the user.

4. The device according to claim 3, wherein, the user class comprises the user's sex and user's age group.

5. A computer readable storage medium on which a computer program is stored, wherein the program, when executed by a processor, implements a voiceprint recognition method, wherein the method comprises:
   pre-establishing a user interest model, comprising:
      obtaining a user history log, where the user history log includes at least: a user identifier, user attribute information, and user historical behavior data; and
      classifying the user historical behavior data according to a user category and a vertical class to obtain the user interest model;
   performing model training according to speech features of different user classes, and building voiceprint processing models of different user classes;
   according to an obtained command speech, recognizing, in a voiceprint recognition manner, a user class sending a command speech;
   collecting language materials having colloquial features of different user classes to form a corpus, using the corpus to train a speech recognition model, and obtaining a speech recognition model of the corresponding user class;
   according to the user class, using the speech recognition model to perform speech recognition for the command speech, to obtain a command described by the command speech;
   determining a current vertical class, according to the command;

according to the user class and the current vertical class, using the pre-built user interest model to obtain a recommended interest class associated with the user class and current vertical class;

searching, from a multimedia resource library, for a target resource matched with the recommended interest class, and presenting the target resource to the user.

6. The computer readable storage medium according to claim 5, wherein, the user class comprises the user's sex and user's age group.

\* \* \* \* \*